United States Patent [19]

Nordstrom et al.

[11] Patent Number: 5,518,207
[45] Date of Patent: May 21, 1996

[54] AIRCRAFT DOOR SILL GUARD

[76] Inventors: Arnold Nordstrom, 38575 Bautista Rd., Anza, Calif. 92539; Frank Owen, 100 W. Midway Dr., Sp. 152, Anaheim, Calif. 92805; Henry P. Mayer, 2474 Monterey Peninsula Dr., Corona, Calif. 91720

[21] Appl. No.: 286,678

[22] Filed: Aug. 5, 1994

[51] Int. Cl.$^6$ ................................ B64C 1/20; B64C 1/22
[52] U.S. Cl. ................. 244/129.5; 244/129.4; 244/118.1; 410/69
[58] Field of Search ..................... 244/119, 120, 244/129.1, 129.5, 129.4, 118.1, 137.1; 410/69, 83, 101

[56] References Cited

U.S. PATENT DOCUMENTS

| | | | |
|---|---|---|---|
| 3,544,046 | 12/1970 | Belolipetsky | 244/129.5 |
| 3,698,679 | 10/1972 | Lang et al. | 410/69 |
| 4,234,278 | 11/1980 | Harshman et al. | 244/118.1 |
| 4,457,649 | 7/1984 | Vogg et al. | 244/118.1 |
| 4,787,577 | 11/1988 | Wohittle | 244/118.1 |
| 4,886,413 | 12/1989 | Leon | 244/118.1 |
| 5,316,242 | 5/1994 | Eilenstein-Wiegmann et al. | 244/118.1 |

FOREIGN PATENT DOCUMENTS

| | | | |
|---|---|---|---|
| 2689851 | 10/1993 | France | 244/118.1 |
| 4210191 | 9/1993 | Germany | 244/118.1 |
| 623044 | 7/1961 | Italy | 244/129.5 |
| 2111120 | 6/1983 | United Kingdom | 244/129.5 |

Primary Examiner—Andres Kashnikow
Assistant Examiner—Virna Lissi Mojica
Attorney, Agent, or Firm—J. E. Brunton

[57] ABSTRACT

A compact aircraft door sill protector of simple design for use in protecting door sills and door locking spools of the character found in a typical aircraft cargo bay. The apparatus includes a sill protector plate that, in its deployed position, covers the door sill and in its stowed position folds conveniently into the area immediately adjacent the cargo bay door opening. In its deployed position, the sill protector plate is rigidly supported by novel support arms that swing into protective engagement with the door locking spools.

14 Claims, 6 Drawing Sheets

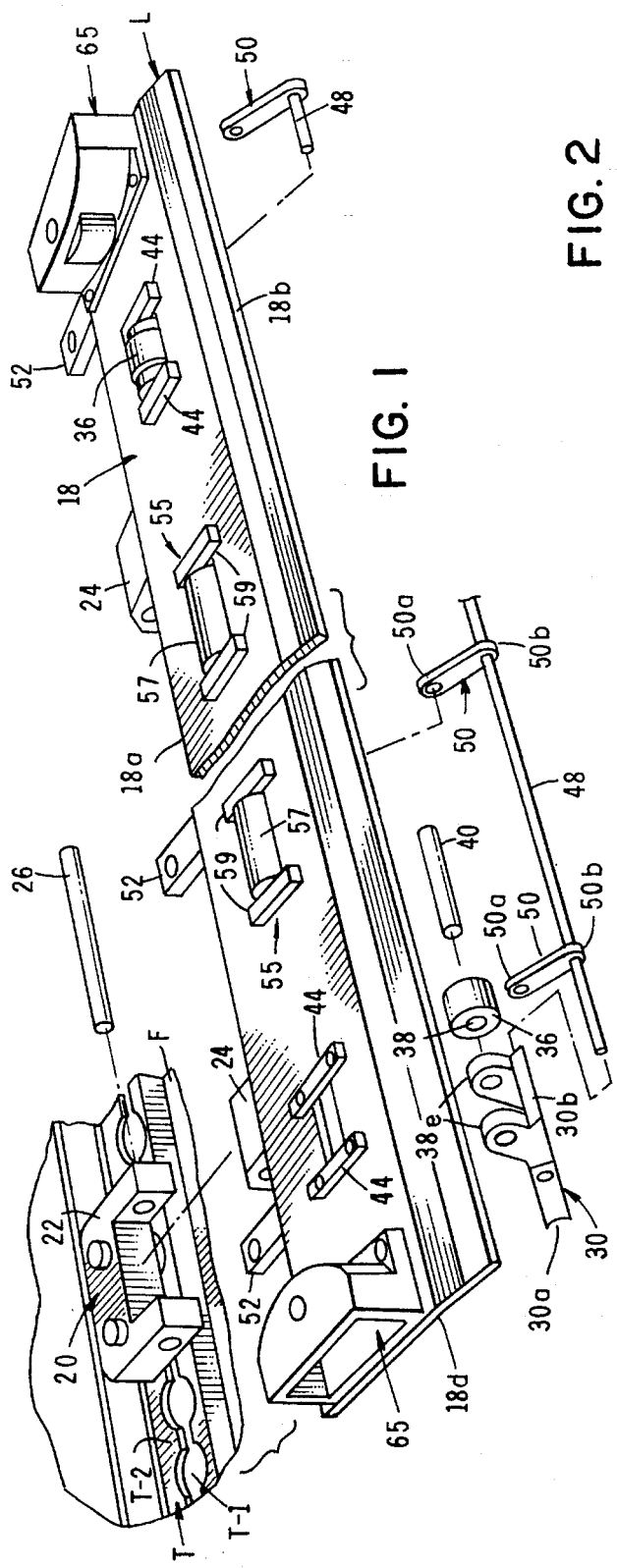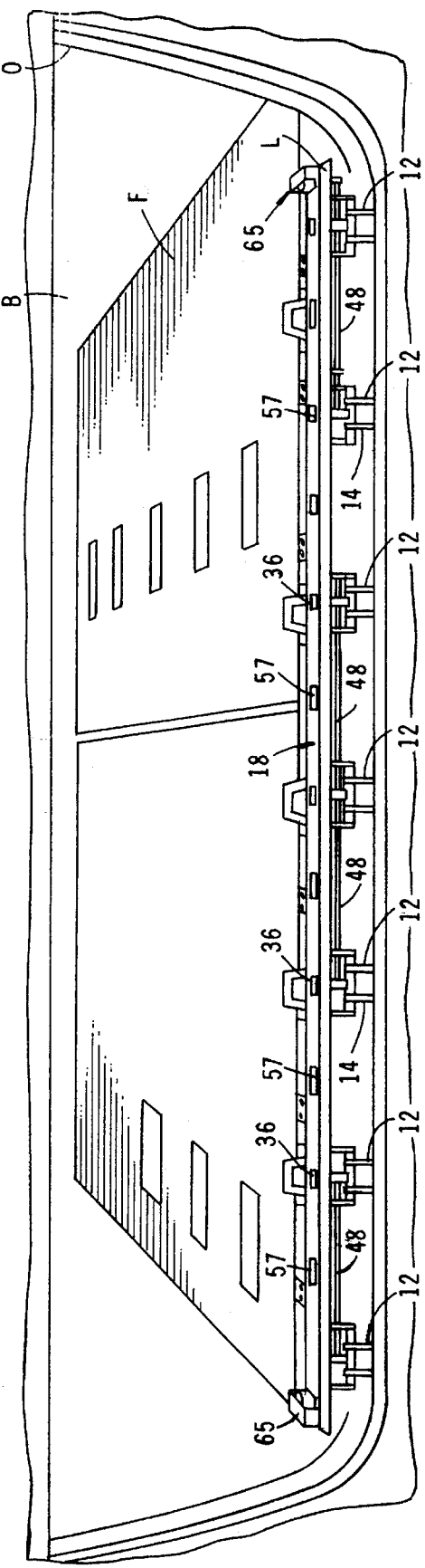

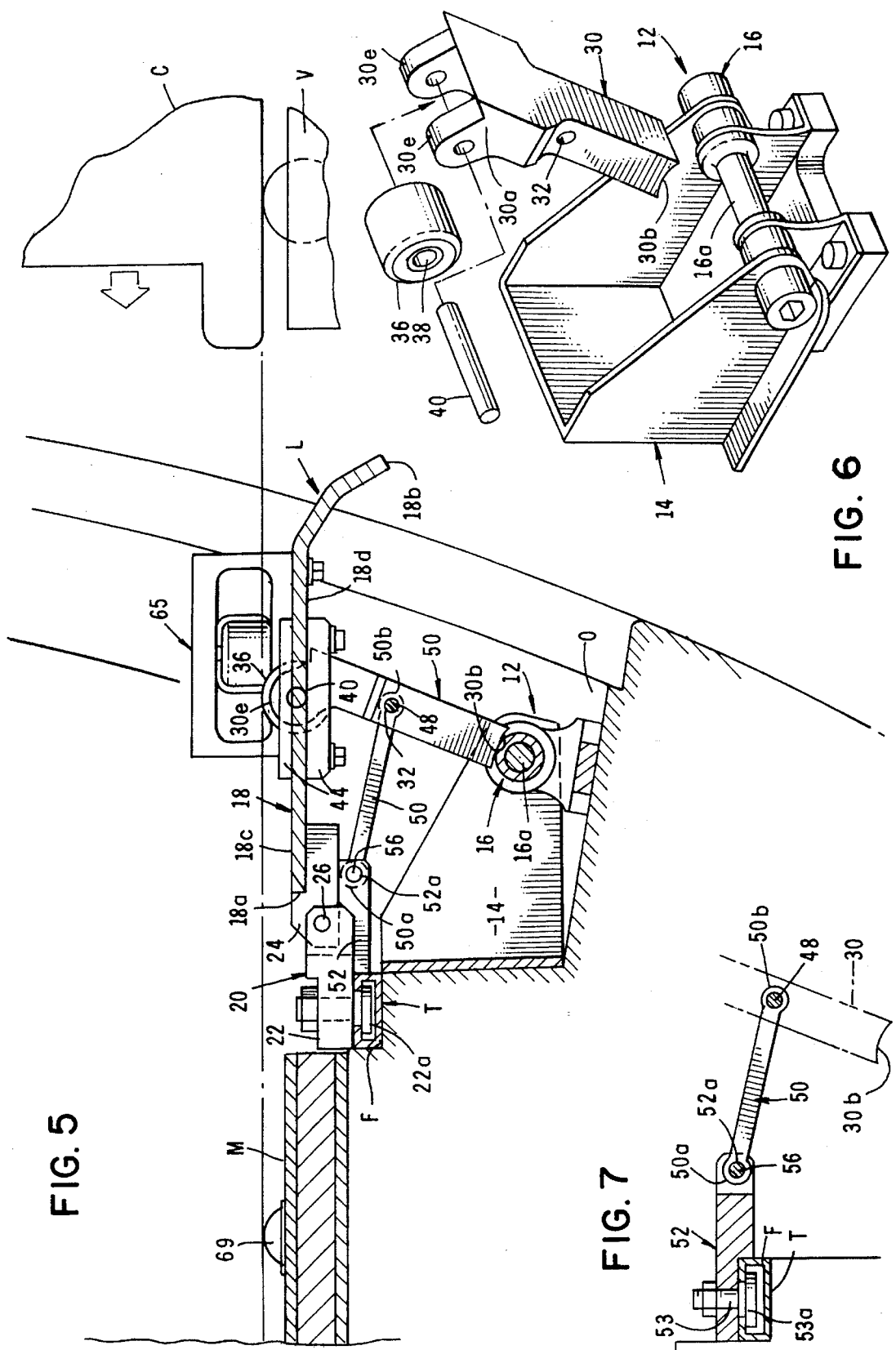
FIG. 5
FIG. 6
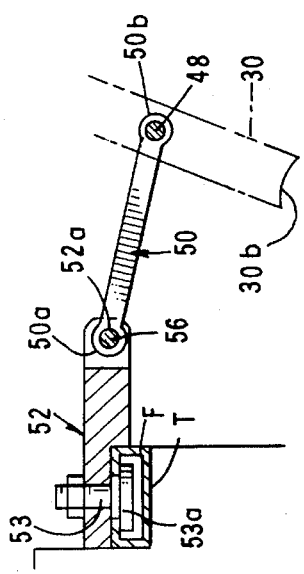
FIG. 7

AIRCRAFT DOOR SILL GUARD

BACKGROUND OF THE INVENTION

1. Field of the Invention

The present invention relates generally to aircraft cargo handling. More particularly, the invention concerns an apparatus for protecting the sill of an aircraft cargo door against damage during cargo loading and unloading.

2. Discussion of the Invention

Transport of cargo by aircraft has increased dramatically over the past several years. As the size of aircraft has increased so has the size of cargo containers and pallets used to transport the cargo to the aircraft making them most cumbersome and difficult to handle and to load into the aircraft cargo holds.

Typically, the cargo to be transported by the aircraft is loaded into the aircraft cargo hold through door openings usually provided in the sides of the aircraft. The door openings are normally closed by doors of complex design which, for safety reasons, must tightly seal within the door opening. Damage to the door opening, and especially to the door sill must be strictly avoided because even slight damage to the sill, or to the door closure or locking spools, which maintain the door in a closed and locked position, can prevent proper closing of the door.

Because the sill of the door opening can easily be damaged during movement of the large cargo containers and pallets into the cargo holds, several types of devices have been suggested in the past to bridge the door sill and protect it from damage. As a general rule, these prior art devices are somewhat crude, bulky and often difficult to handle and store. In some instances, the devices are stored within the cargo hold, thereby taking up valuable cargo space, and in other instances, after the cargo has been loaded they are simply thrown from the aircraft door onto the tarmac below. When thrown from the aircraft, the bridging devices can easily be damaged, or misplaced and lost.

A U.S. Pat. No. 5,312,071 recently issued to Eilenstein-Wiegmann, et al. discloses a more sophisticated mechanical device for protecting an aircraft door sill. This device includes a cover plate having an outwardly extending edge that is supported by a support linkage that includes a support section, a bracing section, first, second and third journals and a foot for releasably cooperating with a holding member that is secured to the aircraft body.

The apparatus of the present invention uniquely overcomes the drawbacks of the prior art sill protecting devices by providing an elegantly simple, lightweight, compact and easy to use sill protector that is made up of a minimum number of component parts. The cover plate of the device is uniquely supported by the existing door closure or locking spools of the aircraft thereby protecting the spools against damage while at the same time greatly simplifying the construction and operation of the sill-protecting apparatus.

SUMMARY OF THE INVENTION

It is an object of the present invention to provide a compact apparatus of simple design for protecting the door sill and door locking spools of an aircraft cargo bay.

It is another object of the invention to provide an apparatus of the aforementioned character which includes a sill protector plate that, in its deployed position, covers the door sill and in its stowed position folds conveniently into the area immediately adjacent the cargo bay door opening.

Another object of the invention is to provide a sill protecting device which embodies a minimum number of component parts and one which, when in its deployed position, protects not only the door sill but also the door locking spools which are disposed adjacent the cargo bay door opening.

Another object of the invention is to provide a sill protecting apparatus of the character described in the preceding paragraphs which is light weight, easy to use and highly reliable in operation requiring virtually no maintenance.

Still another object of the invention is to provide an apparatus of the class described which can be permanently installed in a number of different aircraft without making any substantial modifications to the aircraft.

BRIEF DESCRIPTION OF THE DRAWINGS

FIG. 1 is a foreshortened, generally perspective view of one form of the aircraft door sill guard assembly of the invention.

FIG. 2 is a fragmentary, generally perspective view of the door opening in the side of the aircraft leading to the aircraft cargo hold showing the apparatus of the invention mounted proximate the lower portion of the door opening.

FIG. 5 is a greatly enlarged view, partly in section, taken along lines 5—5 of FIG. 3.

FIG. 6 is a generally perspective, exploded view of one of the aircraft door spools which is permanently mounted proximate the aircraft door opening and of portions of one of the support arms of the apparatus.

FIG. 7 is a cross-sectional view taken along lines 7—7 of FIG. 4 showing one of the pivoting link assemblies of the apparatus.

DESCRIPTION OF THE INVENTION

Figures 3, 4:
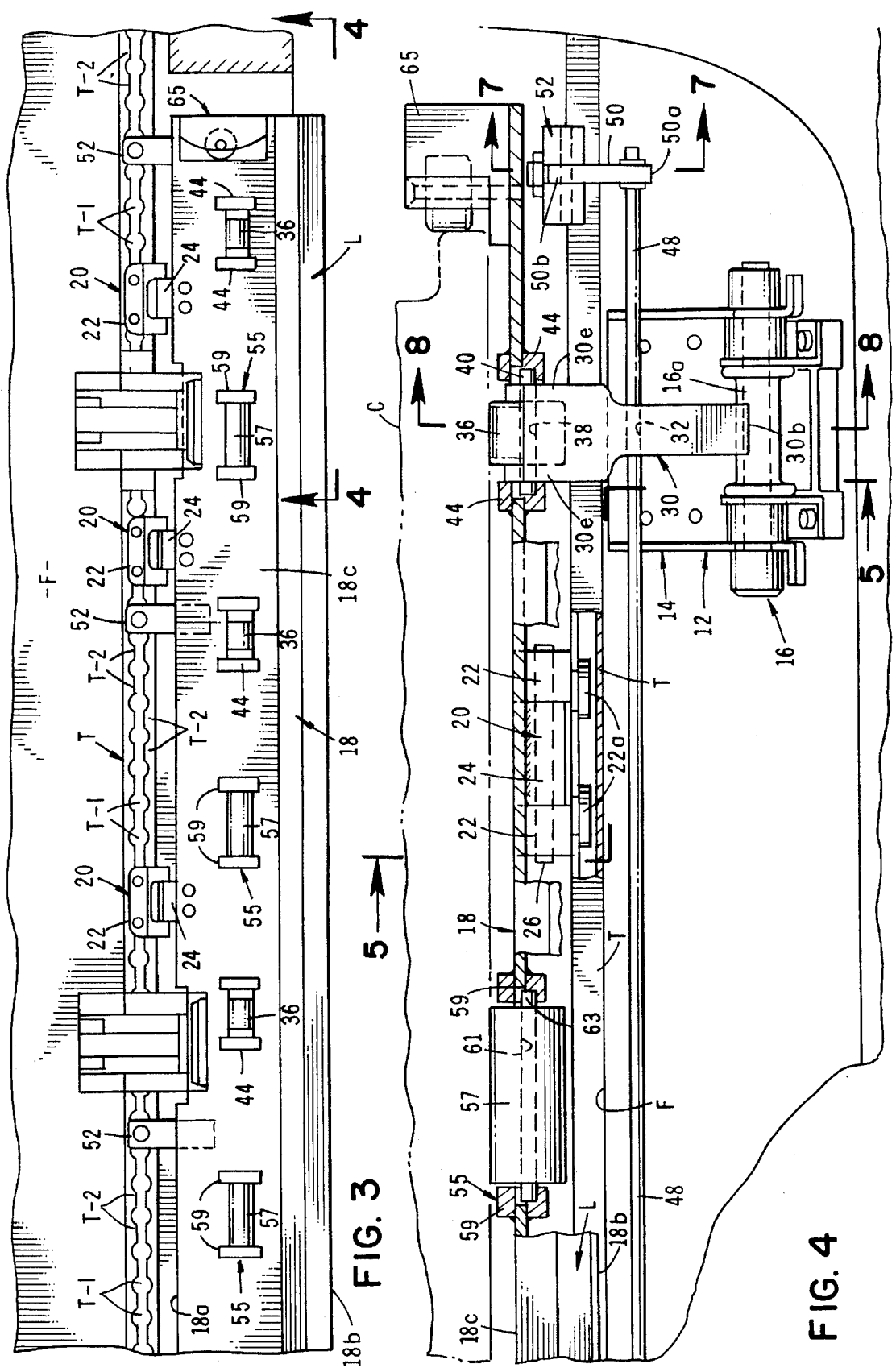
FIG. 3 is a fragmentary, top plan view of one form of the door sill guard of the present invention shown in its deployed position.
FIG. 4 is a greatly enlarged view, partly in section, taken along lines 4—4 of FIG. 3.

Referring to the drawings and particularly to FIGS. 1, 2, 4 and 5, one form of the aircraft door sill guard assembly of the present invention is there illustrated. The assembly of this form of the invention is designed to protect an aircraft door sill of a character that is disposed within a cargo door opening provided in the side of the aircraft. More particularly, the apparatus of the invention is designed for use with aircraft in which the aircraft doors include closure mechanisms adapted for locking engagement with longitudinally spaced-apart door locking spools which are mounted on the side of the aircraft proximate the lower portion of the door opening.

As best seen by referring to FIGS. 2 and 3, the opening "O" in the side of the aircraft leads to a cargo bay "B" having a floor "F" that is provided with a longitudinally extending track "T". As indicated in FIG. 2, the longitudinally spaced, door closure spool assemblies, generally designated as 12, are permanently mounted on the side of the aircraft proximate the lower portion of the door opening "O". As shown in FIGS. 5 and 6, each of these aircraft door locking spools comprise a bracket 14 which supports a spool assembly 16 having a central, generally cylindrically shaped portion 16a (FIG. 6).

In the embodiment of the invention shown in the drawings, the aircraft door sill guard assembly comprises an elongated sill cover plate 18 which is hingably connected to track "T" by means of longitudinally spaced apart hinge means or hinge assemblies 20 (FIGS. 1 and 5). As indicated in FIG. 1 of the drawings, each hinge assembly 20 comprises a hinge block 22 and a cooperating hinge leaf 24. In a manner presently to be described, hinge block 22 is affixed to a track "T", which is, in turn, affixed to the floor of the cargo bay. Leaf 24 is pivotally connected with hinge block 22 by means of a pivot pin 26 which is receivable within aligned bores provided in hinge block 22 and hinge leaf 24 (see also FIG. 5).

Track "T" has an upper wall having a plurality of circular shaped apertures T-1 which are connected by necked-down portions T-2. The upper wall and the lower wall of the track define a channel which slidably receives a downwardly extending, circular shaped head portion 22a provided on each hinge block 22 (FIG. 5). With this construction, hinge blocks 22 are connected to track "T" by inserting head portion 22a into a selected aperture T-1 and sliding the block one way or the other (see also FIG. 3).

As also shown in FIG. 1, cover plate 18 has inner and outer edges 18a and 18b and upper and lower opposing surfaces 18c and 18d respectively. Hinge assemblies 20 are connected to plate 18 at longitudinally spaced apart locations along inner edge 18a (FIG. 3) while outboard edge 18b terminates in an angularly downwardly depending lip portion "L".

Figure 8:
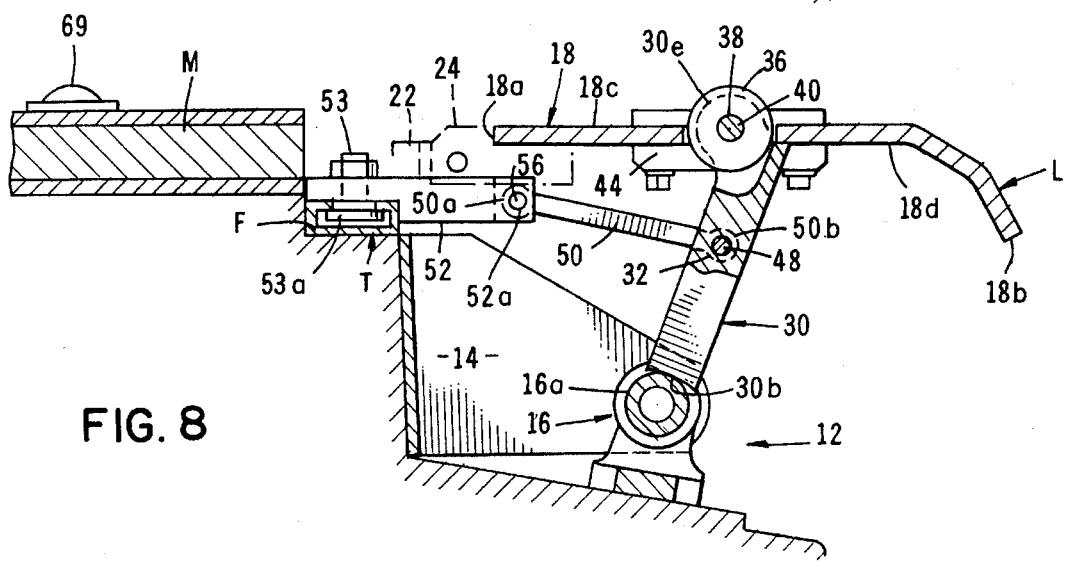
FIG. 8 is a cross-sectional view, partly in section, taken along lines 8—8 of FIG. 4, once again showing the sill guard in a deployed position.

An important aspect of the apparatus of the present invention is the provision of novel support means for rigidly supporting the cover plate when the cover plate is in the second downward or deployed position shown in FIGS. 5 and 8. As best seen by referring to FIGS. 4, and 6, the support means of the present embodiment of the invention comprises a plurality of pivotally movable support members 30 each of which has first and second ends 30a and 30b and each of which is provided with a bore 32 extending through the main body of the member at a location intermediate its first and second ends. In a manner presently to be described in greater detail, each support member 30 is pivotally connected to cover plate 18 for movement of the second generally concave end 30b thereof from the first stowed position shown in FIG. 9 to the second deployed position shown in FIGS. 5 and 8 wherein concave end 30b engages the center portion of a selected one of the locking spools 16 (FIG. 4).

Turning particularly to FIGS. 4 and 6, it is to be noted that end 30a of each support member 30 is provided with transversely spaced-apart, ear-like portions 30e. Receivable between ear-like portions 30e is a roller 36 which is rollably connected to member 30 by roller connector means. Each roller 36 has a central bore 38 and the roller connector means here comprises an axle 40 and a pair of spaced-apart bearing blocks 44 which support axle 40 and are affixed to cover plate 18 in the manner best seen in FIGS. 1 and 4. With this construction, roller 36 protrudes above the upper surface of cover plate 18 so as to rotatably engage cargo carriers "C" as they are rolled into the cargo bay from cargo transport vehicles "V" in the manner depicted in FIG. 5.

Another important feature of the support means of the apparatus of the present invention comprises control means for controlling the pivotal movement of the support arms so that, in their deployed position, they move precisely into engagement with the door locking spools. The control means here comprises the previously mentioned pivoting link mechanisms of the invention for controlling pivotal movement of support members 30 from their deployed position to their retracted, stowed position. As best seen in FIGS. 2 and 10, the pivoting link assembly includes an elongated pivot rod 48, which extends through the bores 32 provided in each of the support members. With this construction, the pivot rod provides an axis about which each of the support members can controllably pivot. Pivotally connected to pivot rod 40 at longitudinally spaced locations are a plurality of link members 50, each of which has an apertured first end portion 50a and an apertured second end portion 50b.

Figure 9:
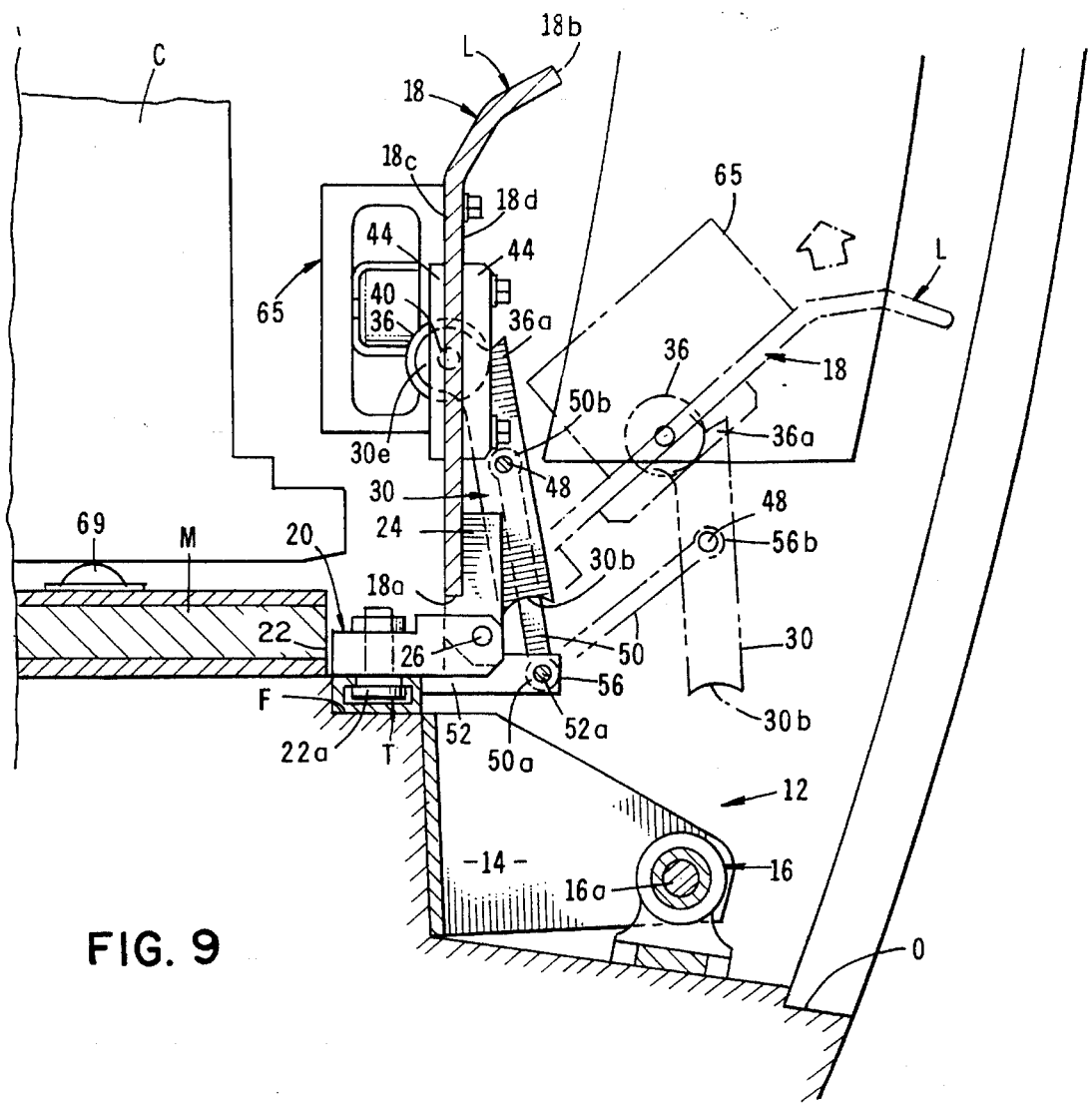
FIG. 9 is a side-elevational, cross-sectional view, similar to FIG. 8 but showing the sill guard in an upper, retracted or stowed position.
Figure 10A:
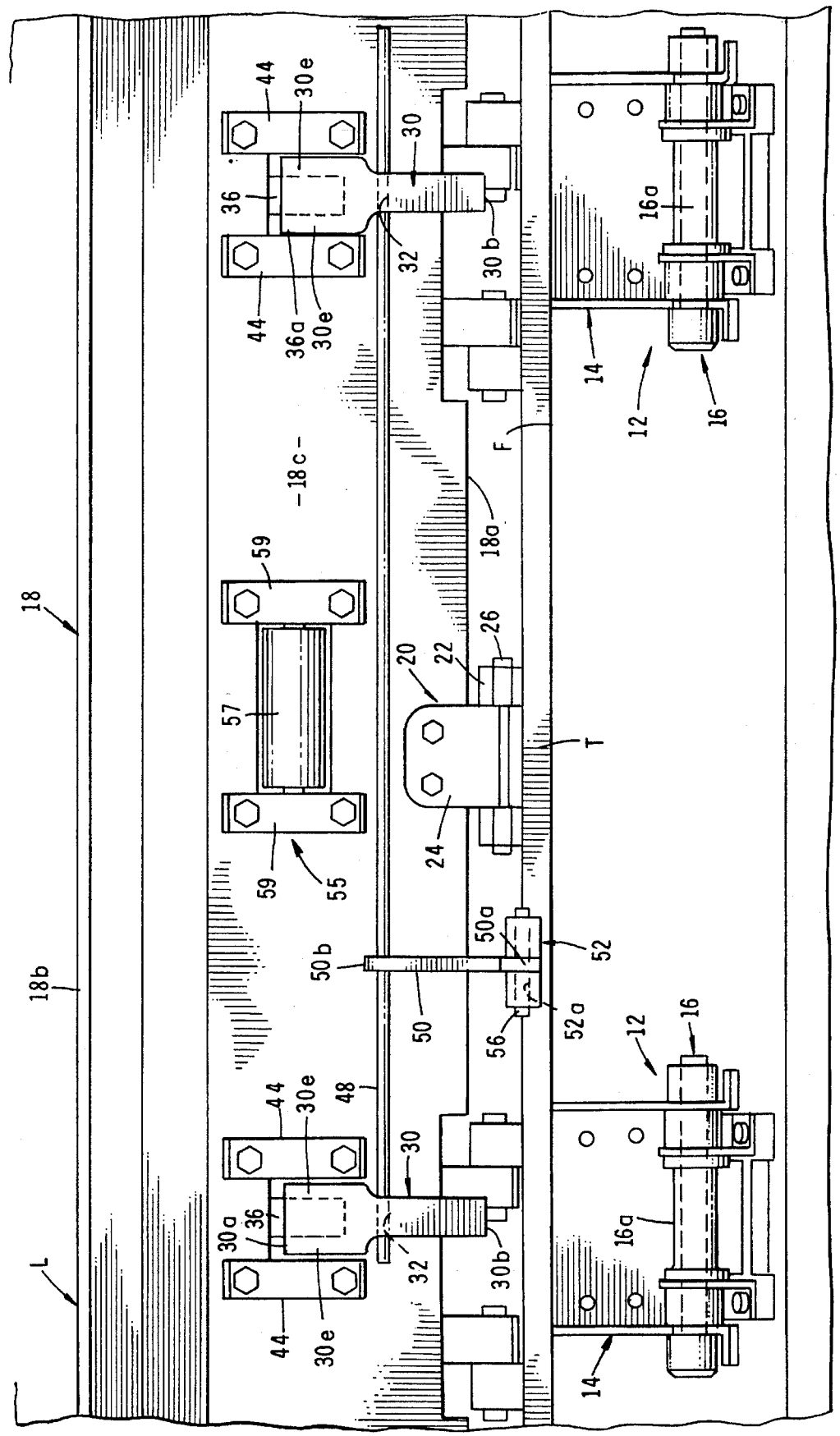
FIGS. 10A and 10B together comprise a front enlarged view similar to FIG. 2, but showing the sill guard in the stowed position and showing in greater detail the construction and arrangement of the pivoting link members which pivot about an elongated pivot rod that interconnects the sill guard support arms.
Figure 10B:
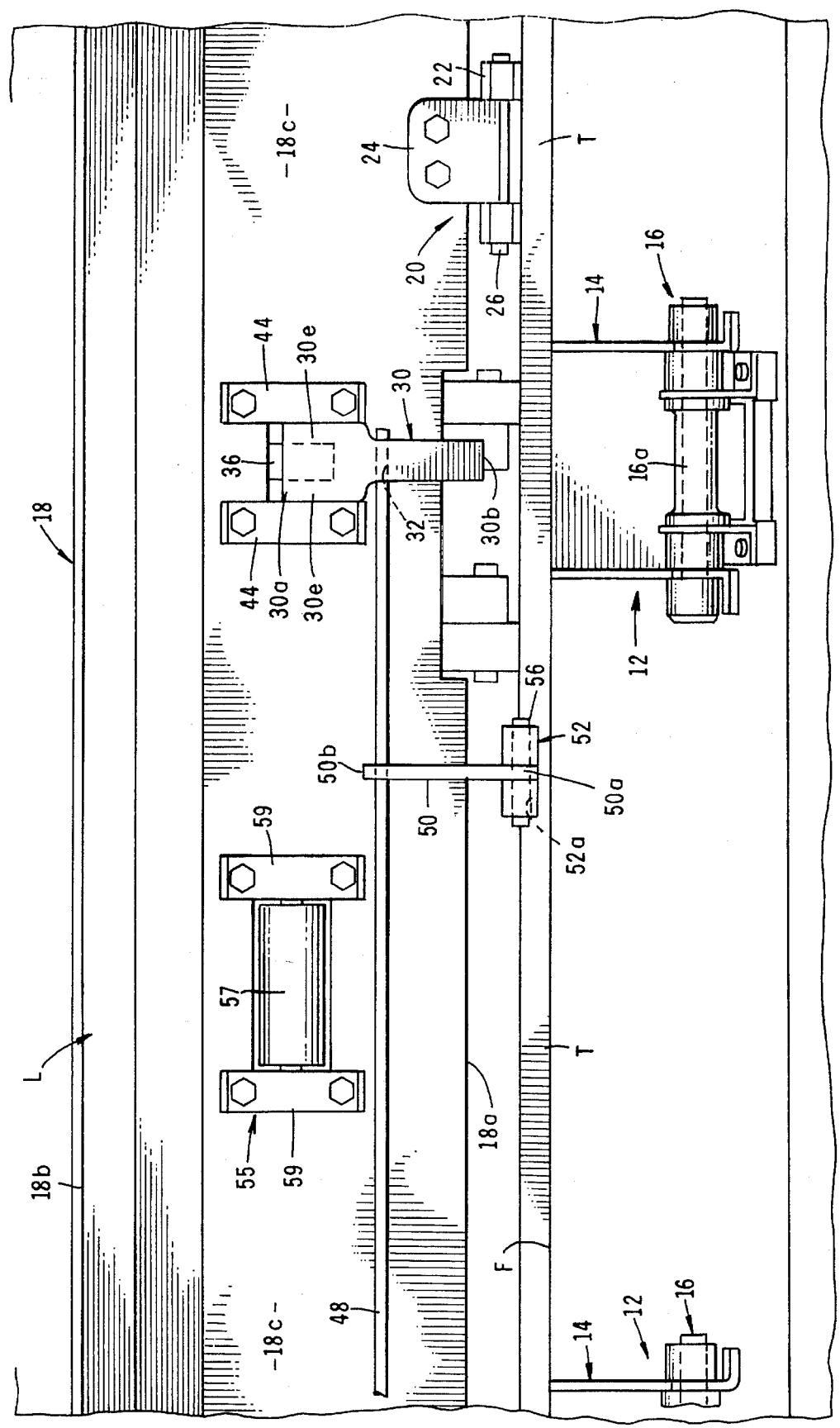

As best seen in FIGS. 8, 9, and 10, each link 50 is pivotally interconnected proximate its end 50a with a pivot block 52 which, in turn, is interconnected with tract "T" of floor "F". End 50b of each link member is pivotally connected to pivot rod 48 at longitudinally spaced-apart locations for pivotal movement there about (FIGS. 1 and 10A and 10B).

Turning now to FIG. 7, it is to be noted that each pivot block 52 is provided with track connector means here shown as a connector member 53 having a downwardly extending, downwardly circular head portion 53a. Head portion 53 is receivable within a selected one of the generally circular shaped apertures T-1 provided in track "T" and can be locked in position by sliding the pivot block one direction or another so that the head portion 53a resides beneath a selected one of the neck-down portions T-2 of the top wall of the track. As indicated in FIGS. 10A and 10B, each pivot block 52 is provided with a central bore 52a through which a pivot pin 56 extends. Pivot pin 56 also extends through the apertured end 50a of each pivoting link 50 so as to enable free pivotal movement of each link 50 relative to the pivot block to which it is interconnected.

With the construction described in the preceding paragraphs, cover plate 18 can be raised from the deployed position shown in FIG. 8 to the retracted or stowed position shown in FIG. 9 by exerting a lifting force on lip "L" in the direction of the arrow of FIG. 9. As the cover plate is lifted, end 30b of each support member 30 will separate from the locking spool with which it has been engaged and will pivot upwardly in the manner indicated by the phantom lines in FIG. 9. A continued lifting movement of cover 18 will cause it to move into the substantially vertically extending position shown in FIG. 9. At the same time, members 30, along with pivot links 50, which control the pivotal movement of members 30, will pivot into the stowed position indicated by the solid lines in FIG. 9. In this position, the cover plate will be compactly located between the cargo carriers disposed within the cargo bay and the door of the aircraft after the door has been moved into locking engagement with spool assemblies 16. As indicated in FIG. 9, in its stowed position, the sill guard assembly will in no way interfere with the normal opening and closing of the aircraft door.

Referring once again to FIGS. 1, 10A and 10B, another important feature of the sill guard assembly of the present invention comprises roller means which are carried by cover plate 18 at spaced apart locations intermediate support members 30. These roller means, which are generally designated in FIG. 1 by the numeral 55, each comprise a roller 57 which is rollably supported between axle support blocks 59 that are mounted on cover plate 18 in the manner best seen in FIG. 4. As indicated in FIG. 4, each roller 57 is provided with a central bore 61 which receives an axle 63, each end of which is, in turn, rotatably supported in the axle support blocks 59.

Turning once again to FIG. 1, it is to be noted that the roller means further include end roller assemblies 65 which are provided proximate each end of cover plate 18. These end roller assemblies guidably engage the sides of the cargo carriers as the cargo carriers pass across cover plate assembly 18 and into the cargo bay in the manner indicated in FIG. 5. More particularly, as the carriers are rolled from the transport vehicle "V" into the cargo bay, they pass over rollers 57 as well as rollers 36 which, as previously described, comprise part of the support means of the invention. As the carriers "C" enter the cargo bay, they will rollably engage a multiplicity of rollers 69 provided in ball matt assemblies "M" of the character typically found in the cargo bays of most cargo aircraft (FIG. 5).

Having now described the invention in detail in accordance with the requirements of the patent statutes, those skilled in this art will have no difficulty in making changes and modifications in the individual parts or their relative assembly in order to meet specific requirements or conditions. Such changes and modification may be made without departing from the scope and spirit of the invention, as set forth in the following claims.

We claim:

1. An aircraft door sill guard assembly for protecting an aircraft door sill disposed within a longitudinally extending opening in the side of the aircraft leading to a cargo bay having a floor, the door of the aircraft having a closure mechanism engagable with at least one locking spool mounted on the side of the aircraft proximate the door opening, said sill guard assembly comprising:

(a) an elongated sill cover plate having inner and outer edges;

(b) at least one hinge connecting said inner edge of said cover plate to the floor of the cargo bay; and (c) support means for supporting said cover plate, said support means comprising at least one support member having first and second ends, said first end thereof being pivotally connected to said cover plate and said second edge thereof being engagable with the locking spool of the aircraft.

2. A sill guard assembly as defined in claim 1 in which said support means comprises a plurality of longitudinally spaced support members, and control means for controlling the pivotal movement of said support members.

3. A sill guard assembly as defined in claim 2 in which said control means includes an elongated pivot rod connected to said support members and at least one link member having a first end portion and a second end portion, said first end portion being pivotally connected to the floor of the cargo bay of the aircraft and said second end portion being pivotally connected to said pivot rod.

4. A sill guard assembly as defined in claim 2, further including a plurality of roller means mounted on said cover plate, for rollably engaging cargo carriers being moved into the cargo hold over said cover plate.

5. An aircraft door sill guard assembly for protecting an aircraft door sill disposed within an opening provided in the side of the aircraft leading to a cargo bay receiving cargo carriers, said cargo bay including a floor having a track, said aircraft door having a closure mechanism engagable with at least one of a plurality of longitudinally spaced apart door locking spools mounted on the side of the aircraft proximate the opening, said sill guard assembly comprising:

(a) an elongated sill cover plate having upper and lower, generally planar surfaces and inner and outer edges, said cover plate being movable from a first upraised, stowed position to a second sill covering deployed position;

(b) hinge means connected to the track of the cargo bay for permitting pivotal movement of said cover plate relative to the track between said first and second positions; and (c) support means for supporting said cover plate when said cover plate is in said second deployed position, said support means comprising a plurality of support members, each having a first and a second end, said first end of each support member being pivotally connected to said cover plate for movement of said second end thereof from a first stowed position to a second position wherein said second end of said support member engages one of the locking spools.

6. A sill guard assembly as defined in claim 5 in which each of said support members is provided with a bore therethrough located intermediate said first and second ends thereof and in which said support means further includes:

(a) an elongated pivot rod extending through said bores provided in each said support member for pivotal movement of each said support member about said pivot rod; and (b) a plurality of link members, each having a first end portion and a second end portion, said second end portion of each said link member being pivotally connected to said pivot rod; and (c) a plurality of pivot blocks connected to the track of the cargo bay, said first end portion of each said link member being pivotally connected to a selected one of said pivot blocks.

7. A sill guard assembly as defined in claim 5 in which said second end of each of said support members defines a concave surface for engagement with a selected locking spool.

8. A sill guard assembly as defined in claim 7 in which at least one roller means is provided intermediate adjacent support members for rollably engaging the cargo carriers, each said roller means including a roller protruding above said upper planar surface of said sill cover plate for engagement with the cargo carriers.

9. A sill guard assembly as defined in claim 8 further including end roller means disposed proximate each end of said sill cover plate for rollably engaging the cargo carriers.

10. An aircraft door sill guard assembly for protecting an aircraft door sill disposed within a door opening provided in the side of the aircraft leading to a cargo bay having a floor for supporting cargo carriers, said floor being provided with a longitudinally extending track, said aircraft door having a closure mechanism engagable with one of a plurality of longitudinally spaced apart door locking spools mounted on the side of the aircraft proximate the door opening, said sill guard assembly comprising:

(a) an elongated sill cover plate having upper and lower, generally planar surfaces and inner and outer edges, said cover plate being movable from a first upraised, stowed position to a second, sill covering deployed position;

(b) a plurality of hinges connecting said inner edge of said cover plate to the track of the cargo bay; and (c) support means for supporting said cover plate when said cover plate is in said second deployed position, said support means comprising:

(i) a plurality of support members, each having a first and a second end and a bore extending therethrough intermediate said first and second ends, said first end of each support member being pivotally connected to said cover plate for movement of said second end thereof from a first stowed position to a second position wherein said second end of said support member engages one of the locking spools;

(ii) an elongated pivot rod extending through said bores provided in each said support member for pivotal movement of each said support member about said pivot rod;

(iii) a plurality of link members, each having a first end portion and a second end portion, said second end portion of each said link member being pivotally connected to said pivot rod; and (iv) a plurality of pivot blocks connected to the track of the cargo bay, said first end portion of each said link member being pivotally connected to a selected one of said pivot blocks.

11. A sill guard assembly as defined in claim 10 in which each of said support members includes a pair of spaced apart ears and in which said support means further includes a roller receivable between said spaced apart ears.

12. A sill guard assembly as defined in claim 11 in which said support means further includes roller connector means for connecting said rollers to said cover plate.

13. A sill guard assembly as defined in claim 13 in which each said bearing is provided with a central bore and in which said bearing connector means comprises an axle receivable within said central bore of said bearing and means mounted on said upper surface of said cover plate for rotatably supporting said axle.

14. A sill guard assembly as defined in claim 12 in which said outer edge of said sill cover plate includes an angularly downwardly extending lip portion.

* * * * *